Feb. 26, 1963   R. M. MILTON   3,078,635
WATER SEPARATION FROM A VAPOR MIXTURE
Filed Jan. 6, 1960   3 Sheets-Sheet 1

INVENTOR.
ROBERT M. MILTON
BY
ATTORNEY

United States Patent Office 3,078,635
Patented Feb. 26, 1963

3,078,635
WATER SEPARATION FROM A VAPOR MIXTURE
Robert M. Milton, Buffalo, N.Y., assignor to Union
Carbide Corporation, a corporation of New York
Filed Jan. 6, 1960, Ser. No. 837
11 Claims. (Cl. 55—35)

This invention relates to a method for adsorbing fluids and separating a mixture of fluids into its component parts. More particularly, the invention relates to a method of adsorbing fluids with adsorbents of the molecular sieve type. Still more particularly, the invention relates to a method for preferentially adsorbing water from a fluid mixture containing at least one member of the group consisting of methane, ethane, propane, isobutane, hexane and low boiling point gases such as oxygen, hydrogen, nitrogen and air. This application is a continuation-in-part of co-pending application Serial Number 400,386 filed December 24, 1953, now abandoned.

This separation is advantageous in removing water vapor from fuel gas; in preventing hydrate formation when transporting gases in pipe lines; in removing moisture from gas streams in the manufacture of steroids and hormones; in removing moisture from gases used in instrumentation to prevent corrosion and also in air conditioning and other related systems.

Broadly, the invention comprises mixing molecules, in a fluid state, of the materials to be adsorbed or separated with at least partially dehydrated crystalline synthetic zeolite X.

Zeolite X and the methods for making zeolite X are described in detail and claimed in U.S. patent application Serial No. 400,389, filed December 24, 1953, now U.S. Patent No. 2,882,244 issued April 14, 1959, in the name of R. M. Milton.

It is the principal object of the present invention to provide a process for the selective adsorption of molecules from fluids. A further object of the invention is to provide a method whereby certain molecules may be adsorbed and separated by crystalline synthetic zeolite X.

In the drawing, FIGURE 1 is a graph showing the weight percent of water adsorbed versus the temperature ratio $T_2/T_1$ for zeolite X.

Figure 1:
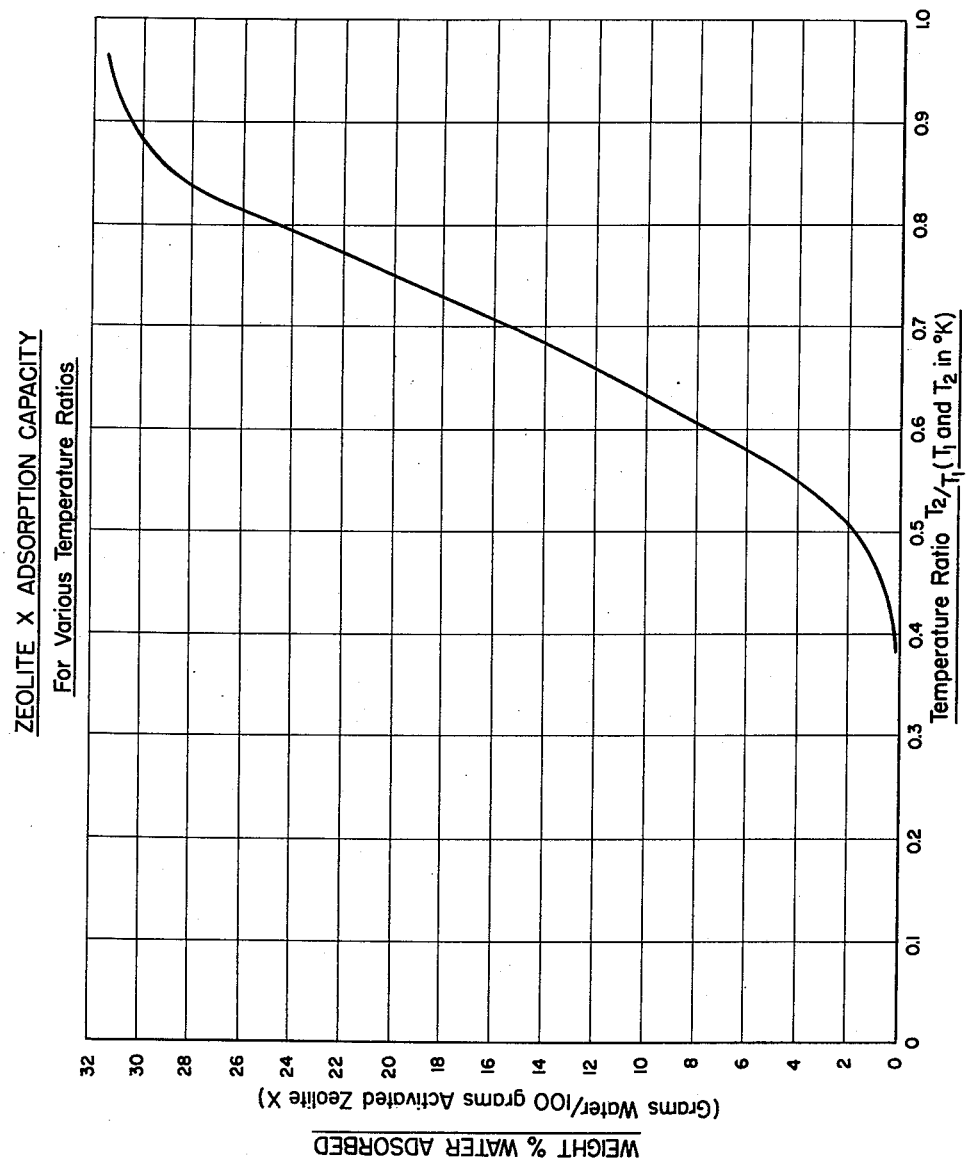

The formula for zeolite X may be written as follows:

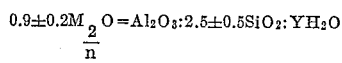

$$0.9 \pm 0.2 M_{\frac{2}{n}}O = Al_2O_3 : 2.5 \pm 0.5 SiO_2 : YH_2O$$

In this formula "M" represents a metal, "n" its valence, and "Y" may be any value up to 8 depending on the identity of the metal and the degree of dehydration of the crystals. X-ray diffraction data may be employed to define the crystal structure of zeolite X. Such information and processes for synthesizing zeolite X are provided in U.S. Patent 2,882,244.

The adsorbents contemplated herein include not only the sodium form of zeolite X, which is a common form produced, but also crystalline materials obtained from such a zeolite by partial or complete replacement of the sodium ion with other cations. The sodium cations can be replaced, in part or entirely, by ion exchange with other monovalent, divalent, or trivalent cations. This may be accomplished by ion exchange techniques.

Zeolite X exhibits adsorptive properties that are unique among known adsorbents. The common adsorbents, like charcoal and silica gel, show adsorption selectivities based primarily on the boiling point or critical temperature of the adsorbate. Activated zeolite X on the other hand, exhibits a selectivity based on the size and shape of the adsorbate molecule. Among these adsorbate molecules whose size and shape are such as to permit adsorption by zeolite X, a very strong preference is exhibited toward those that are polar, polarizable, and unsaturated. Another property of zeolite X that contributes to its unique position among adsorbents is that of adsorbing large quantities of adsorbate at either very low pressure, at very low partial pressures, or at very low concentrations. One or a combination of one or more of these adsorption characteristics or others can make zeolite X useful for numerous gas or liquid separation processes where adsorbents are not now employed. The use of zeolite X permits more efficient and more economical operation of numerous processes now employing other adsorbents. Common adsorbents like silica gel and charcoal do not exhibit any appreciable molecule sieve action, whereas the various forms of zeolite X do.

The following data contained in Table I show the adsorptions of water, saturated aliphatic hydrocarbons and low boiling point gases such as oxygen, hydrogen and nitrogen. In this table as well as elsewhere in the specification the term "weight percent adsorbed" refers to the percentage increase in the weight of the adsorbent.

An important characteristic of zeolite X is its property of adsorbing large amounts of adsorbates at low adsorbate pressures, partial pressure, or concentrations. This property makes zeolite X useful in the removal of water from gas and liquid mixtures, since it has a relatively high adsorption capacity even when the material being adsorbed from a mixture is present in very low concentrations. Efficient recovery of minor components of mixture is also possible. The high adsorption of water at low pressures on zeolite X is illustrated in the following Table I along with some comparative data for silica gel and charcoal.

TABLE I

| Adsorbate | Temp., °C. | P., mm. Hg | Weight percent adsorbed | | | | | | | | |
|---|---|---|---|---|---|---|---|---|---|---|---|
| | | | Na$_2$X | CaX | MgX | BaX | MnX | Li$_2$X | Ce$_2$X$_3$ | Silica gel | Charcoal |
| Water | 25 | 0.2 | 25.7 | | | | | | | 1.6 | 0.1 |
| | 25 | 0.04 | | 22.9 | | 20.7 | 19.3 | | 13.1 | | |
| | 25 | 4.5 | 29.3 | 33.3 | 34.2 | 25.8 | 31.9 | 31.8 | 27.1 | | |
| | 25 | 0.02 | 14.5 | | | | | | | 0.7 | 0.4 |
| | 25 | 0.1 | 23.1 | | | | | | | 1.2 | |
| | 25 | 4.5 | 32.3 | | | | | | | 11.4 | 2.7 |
| | 25 | 24 | 39.5 | | | | | | | 42.9 | 24.1 |
| | 25 | 0.1 | 23.1 | | | | | | | 1.2 | |
| | 25 | 4.5 | 32.3 | | | | | | | 11.4 | |
| | 25 | 24 | 39.5 | | | | | | | 42.9 | |
| | 100 | 0.6 | 9.6 | | | | | | | 0.2 | |
| | 100 | 4.5 | 15.8 | | | | | | | 0.6 | |
| | 100 | 24 | 20.9 | | | | | | | 15 | |
| Methane | 25 | 500 | <1.0 | | | | | | | | |
| C$_2$H$_6$ | 25 | 5 | .2 | | | | | | | | |
| | 25 | 25 | .8 | | | | | | | | |
| | 25 | 300 | 8.3 | | | | | | | | |
| | 25 | 700 | 10.2 | | | | | | | | |
| C$_3$H$_8$ | 25 | 1.0 | 0.8 | | | | | | | | |
| | 25 | 5 | 3.1 | | | | | | | | |
| | 25 | 4 | 2.6 | | | | | | | | |
| | 25 | 25 | 11.1 | | | | | | | | |
| | 25 | 700 | 14.6 | | | | | | | | |
| n-C$_4$H$_{10}$ | 25 | 700 | 17.8 | | | | | | | | |
| | 25 | 710 | 17.6 | | | | | | | | |
| | 25 | 729 | 17.6 | | | | | | | | |
| i-C$_4$H$_{10}$ | 25 | .2 | 2.4 | | | | | | | | |
| | 25 | 5.5 | 11.5 | | | | | | | | |
| | 25 | 400 | 18.4 | | | | | | | | |
| C$_5$H$_{12}$ | 25 | 205 | 18.4 | | | | | | | | |
| | 25 | 224 | 19.3 | | | | | | | | |
| C$_6$H$_{14}$ | 25 | 0.18 | 4.8 | | | | | | | | |
| | 25 | 0.22 | 10.2 | | | | | | | | |
| | 25 | 20 | 19.2 | | 18.3 | 15.8 | 17.9 | 19.2 | 16.1 | | |
| C$_8$H$_{18}$ | 25 | 2.3 | 20.8 | | | | | | | | |
| | 150 | 2.3 | 14.2 | | | | | | | | |
| | 25 | 5.0 | 20.8 | | | | | | | | |
| | 150 | 5.0 | 14.2 | | | | | | | | |
| | 25 | 11.0 | 30 | | | | | | | | |
| Nitrogen | −196 | 5 | 24.8 | | | | | | | | |
| | −196 | 195 | | 27.5 | | | 21.9 | | | | |
| | −75 | 500 | 9.6 | 7.9 | | | 10.0 | | | | |
| | 25 | 500 | <1.0 | | | | | | | | |
| | −75 | 738 | | 9.0 | | | 10.8 | 8.6 | 5.3 | | |
| Oxygen | −196 | 56 | 34.0 | | | | | | | | |
| | −75 | 500 | 5.2 | 5.8 | | | 6.5 | | | | |
| | 25 | 500 | <1.0 | | | | | | | | |
| Hydrogen | −196 | 100 | <1.0 | | | | | | | | |
| | 25 | 500 | <1.0 | | | | | | | | |

These data of Table I show that water is more strongly adsorbed than any other material at comparable temperatures and pressures and illustrate a major use of zeolite X, i.e., the removal of water from mixtures containing water.

An example of the use to be made of this property of strong adsorption at low pressures is the drying of an air stream that contains only small amounts of water initially. For instance, with air containing water at a partial pressure of 0.1 millimeter of mercury, zeolite X adsorbs approximately 23% by weight water. Under similar conditions, silica gel adsorbs only about 1% by weight water.

An advantage that may be taken of this high adsorption at low pressures is the operation of adsorption processes at higher temperatures than are normally used with common adsorbents. The adsorptive power of physical adsorbents usually decreases with increasing temperature and, therefore, while the adsorption capacity of many adsorbents in a certain separation may be sufficient if operated at one temperature, the capacity may not be sufficient to make operation feasible at a higher temperature. With strongly adsorbing zeolite X, however, substantial capacity is retained at higher temperatures. For instance, the adsorption capacities for water on sodium zeolite X and silica gel at 25° C. and 100° C. are tabulated below, and it is seen that sodium zeolite X adsorbs more water at 100° C. than silica gel at 25° C. over most of the pressure range.

| Pressure (mm. Hg) | Weight percent adsorbed at 25° C. | | Pressure (mm. Hg) | Weight percent at silica gel | Adsorbed 100° C. Na$_2$X |
|---|---|---|---|---|---|
| | Silica gel | Na$_2$X | | | |
| 0.1 | 1.2 | 23.1 | 0.6 | 0.2 | 9.6 |
| 4.5 | 11.4 | 32.3 | 4.5 | 0.6 | 15.8 |
| P$_o$ | 42.9 | 39.5 | P$_o$ | 15 | 20.9 |

NOTE.—P$_o$ is the vapor pressure of water at 25° C.

Zeolite X may be used as an adsorbent for the purposes indicated above in any suitable form. For example, a column of powdered crystalline material has given excellent results as has a pelleted form obtained by pressing into pellets a mixture of zeolite X and a suitable binding agent such as clay.

The present process for separating water from certain vapor mixtures depends upon related properties of zeolite X with respect to the adsorbed phase. The first property is the relatively high selectivity of the internal surfaces of the crystal toward water, a polar compound, as compared to saturated aliphatic hydrocarbons containing less than nine carbon atoms per molecule, air, nitrogen and hydrogen. As previously discussed and illustrated by the tables, zeolite X is capable of adsorbing all of these compounds, based on a consideration of the zeolite X pore size and critical molecular dimensions of these compounds. That is, the pores of zeolite X are sufficiently large and in fact do receive, for example, methane, octane, oxygen, air, nitrogen, or hydrogen molecules.

Based on these considerations, one skilled in the art would logically conclude that zeolite X would not possess any particular selectivity for water in preference to the other constituents of the present vapor mixture. Contrary to these expectations, it has been discovered that zeolite X possesses an extremely strong selectivity for water, to the substantial exclusion of saturated aliphatic hydrocarbons having less than nine carbon atoms per molecule, oxygen, air, nitrogen, and hydrogen.

Another interrelated property is the relationship of the boiling point or vapor tension characteristics of an individual fluid or clearly related type of fluid to the capacity of the crystalline zeolite to adsorb the fluid at a given temperature and pressure. More specifically, it has been discovered that a relationship exists between the amount of fluid adsorbed and the temperature ratio $T_2/T_1$ where $T_1$ is the temperature in degrees Kelvin at which the adsorption is carried out, assuming that the temperature of the fluid and the adsorbent are in equilibrium. $T_2$ is the temperature in degrees Kelvin at which the vapor pressure of the fluid is equal to the partial pressure or vapor tension of the fluid in equilibrium with the zeolite adsorbent. Stated in another way, $T_2$ is the temperature at which the vapor pressure of the adsorbate is equal to the partial pressure of the adsorbate during adsorption. $T_2$ is actually the dew point of the adsorbate at the adsorption conditions.

Figure 2:
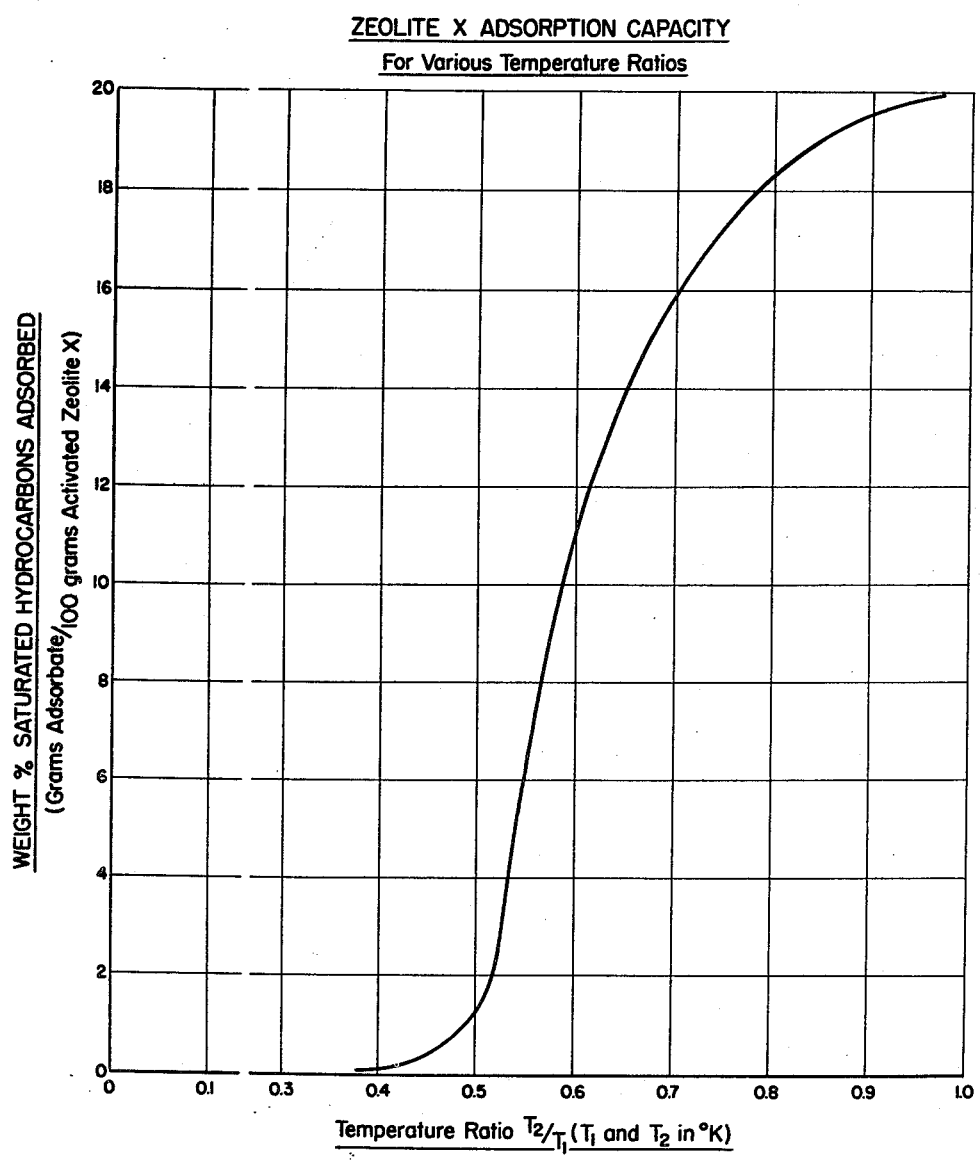
FIGURE 2 is a graph showing the weight percent of saturated hydrocarbons adsorbed versus the temperature ratio $T_2/T_1$ for zeolite X.
Figure 3:
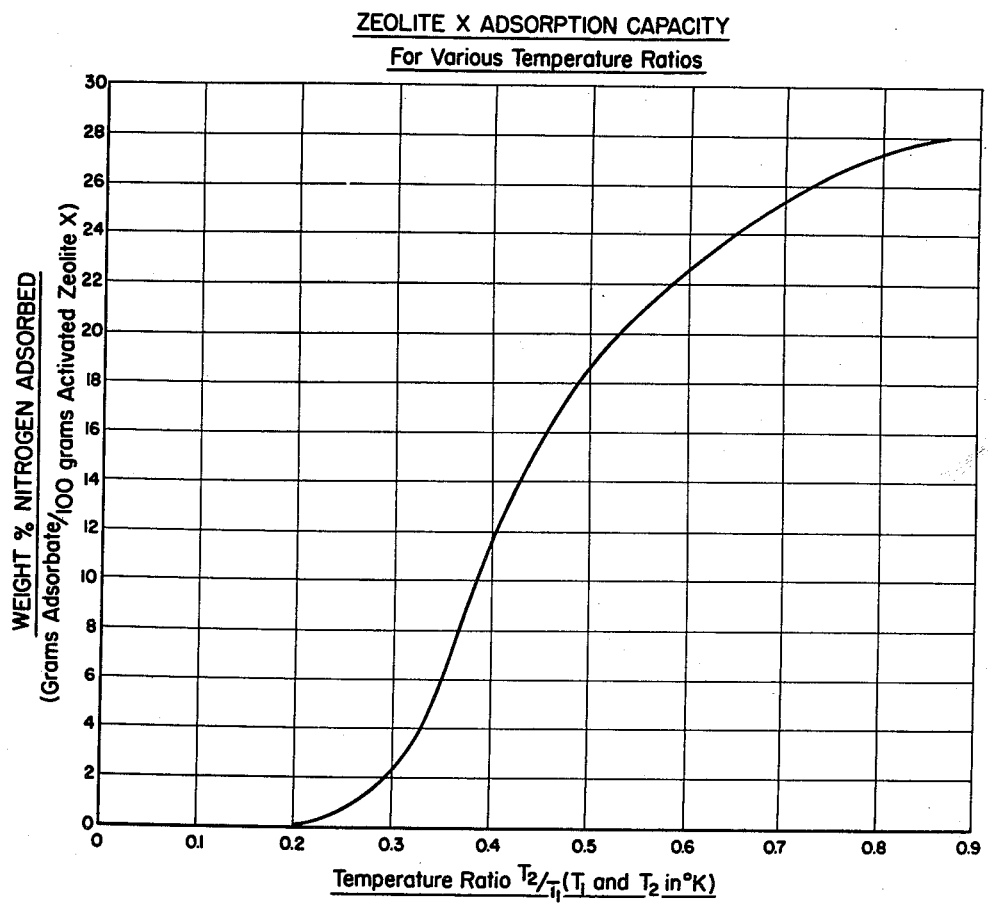
FIGURE 3 is a graph showing the weight percent of nitrogen adsorbed versus the temperature ratio $T_2/T_1$ for zeolite X.

This relationship is clearly shown in FIGURE 1 which is a plot of the weight percent of water adsorbed versus the temperature ratio $T_2/T_1$ for zeolite X. FIGURE 2 is a plot of the weight percent of saturated aliphatic hydrocarbons adsorbed versus the temperature ratio $T_2/T_1$ for zeolite X and FIGURE 3 is a plot of the weight percent of nitrogen adsorbed versus the temperature ratio $T_2/T_1$ for zeolite X. The plots of FIGURES 2 and 3 are presented to illustrate, in conjunction with FIGURE 1, the preferential adsorption of water which can be obtained through the use of zeolite X. The following Tables II, III and IV contain data from which FIGURES 1, 2 and 3 respectively, were prepared. The $T_2$ values were read from the vapor pressure tables in "Industrial and Engineering Chemistry," vol. 39, page 517, April 1947.

The present invention utilizes the properties of zeolite X in such a manner that a novel process is provided for separating water, a polar substance, from a vapor mixture containing at least one member of the group consisting of methane, ethane, propane, isobutane, hexane and low boiling point gases such as oxygen, hydrogen, nitrogen and air. In its broadest form, the process consists of contacting the vapor mixture with a bed of at least partially dehydrated crystalline zeolite X adsorbent material. The water-depleted vapor mixture is then discharged from the crystalline zeolite X bed. Such contact is preferably effected under conditions such that the temperature ratio $T_2/T_1$ with respect to the inlet end of the bed and with respect to at least one member of above identified group of the vapor mixture is between 0.51 and 1.0 (wherein $T_1$ is the adsorption temperature and is less than 973° K., and $T_2$ is the temperature at which the one member of the above identified group of the vapor mixture has a vapor pressure equal to its partial pressure in the vapor mixture. The lower limit of .51 for the temperature ratio $T_2/T_1$ is fixed by the discovery that below this value there is a smaller percentage change in adsorption capacity per unit change in the temperature ratio. In contrast, above .51 there is a larger percentage change in adsorption capacity per unit change in the temperature ratio. Stated in another way, if it is desired to obtain a certain incremental adsorbate loading at a specified adsorption temperature with a given feed stream, it would be necessary to increase the pressure of operation by a greater percent if the temperature ratio is below .51 than if it is maintained above this value in accordance with the invention. Also, the temperature ratio of .51 corresponds to a bed loading of 2 weight percent adsorbate and if the temperature ratio were reduced below this value, a larger adsorption bed would be required with its attendant higher investment and operating expenses.

The upper limit of 1.0 for the temperature ratio should not be exceeded, because if the adsorption temperature is equal to or less than the dew point, condensation of water will occur, thereby essentially eliminating the sieving action of the zeolite X adsorbent. The broad upper limit of 973° K. for $T_1$ is due to the fact that above this temperature, the crystal structure of zeolite X will be disrupted or damaged with consequent loss of adsorption capacity and reduction in pore size, thereby fundamentally changing its adsorptive characteristics.

TABLE II

| Adsorbate | P., mm. Hg | Weight percent adsorbed | Temp. ° K. $T_1$ | Temp. ° K. $T_2$ | $T_1/T_2$ |
|---|---|---|---|---|---|
| Water | 0.4 | 6.7 | 423 | 246 | 0.58 |
| | 26 | 5.4 | 523 | 300 | 0.57 |
| | 17 | 4.6 | 523 | 293 | 0.56 |
| | 9 | 3.6 | 523 | 283 | 0.54 |
| | 3.8 | 2.9 | 523 | 270 | 0.52 |
| | 2.1 | 2.2 | 523 | 264 | 0.51 |
| | 0.4 | 1.3 | 523 | 246 | 0.47 |
| | 26 | 1.4 | 623 | 300 | 0.48 |
| | 17 | 1.4 | 623 | 293 | 0.47 |
| | 9 | 0.7 | 623 | 283 | 0.45 |
| | 24 | 20.9 | 373 | 298 | 0.8 |
| | 24 | 39.5 | 298 | 298 | 1.0 |
| | 0.2 | 25.6 | 298 | 240 | 0.81 |
| | 0.04 | 22.9 | 298 | 225 | 0.76 |
| | 4.5 | 29.3 | 298 | 273 | 0.92 |
| | 4.5 | 33.3 | 298 | 273 | 0.92 |
| | 4.5 | 32.3 | 298 | 273 | 0.92 |
| | 0.02 | 14.5 | 298 | 220 | 0.74 |
| | 0.10 | 23.1 | 298 | 233 | 0.78 |
| | 0.6 | 9.6 | 398 | 250 | 0.63 |
| | 4.5 | 15.8 | 398 | 273 | 0.69 |

TABLE III

| Adsorbate | P., mm. Hg | Weight percent adsorbed | Temp. ° K. $T_1$ | Temp. ° K. $T_2$ | $T_2/T_1$ |
|---|---|---|---|---|---|
| $CH_4$ | 500 | <1.0 | 298 | 100 | 0.36 |
| $C_2H_6$ | 5 | 0.2 | 298 | 125 | 0.42 |
| | 25 | 0.8 | 298 | 145 | 0.49 |
| | 300 | 8.3 | 298 | 168 | 0.56 |
| | 700 | 10.2 | 298 | 183 | 0.61 |
| $C_3H_8$ | 1 | 0.8 | 298 | 144 | 0.48 |
| | 5 | 3.1 | 298 | 158 | 0.53 |
| | 4 | 2.6 | 298 | 161 | 0.54 |
| | 25 | 11.1 | 298 | 174 | 0.58 |
| | 700 | 14.6 | 298 | 233 | 0.78 |
| n-$C_4H_{10}$ | 700 | 17.8 | 298 | 270 | 0.91 |
| | 710 | 17.6 | 298 | 270 | 0.91 |
| | 729 | 17.6 | 298 | 271 | 0.91 |
| i-$C_4H_{10}$ | 0.2 | 2.4 | 298 | 152 | 0.51 |
| | 5.5 | 11.5 | 298 | 180 | 0.60 |
| n-$C_5H_{12}$ | 400 | 18.4 | 298 | 246 | 0.83 |
| | 205 | 18.4 | 298 | 276 | 0.93 |
| | 224 | 19.3 | 298 | 277 | 0.93 |
| n-$C_6H_{14}$ | 0.18 | 4.8 | 298 | 202 | 0.68 |
| | 0.22 | 10.2 | 298 | 204 | 0.69 |
| | 20 | 19.2 | 298 | 259 | 0.87 |
| n-$C_8H_{18}$ | 11.0 | 30 | 298 | 294 | 0.99 |
| | 2.3 | 20.8 | 298 | 277 | 0.93 |
| | 5.0 | 20.8 | 298 | 280 | 0.94 |
| | 2.3 | 14.2 | 423 | 277 | 0.66 |
| | 5.0 | 14.2 | 423 | 280 | 0.66 |

TABLE IV

| Adsorbate | P., mm. Hg | Weight percent adsorbed | Temp. ° K. $T_1$ | Temp. ° K. $T_2$ | $T_2/T_1$ |
|---|---|---|---|---|---|
| Nitrogen | 5 | 24.8 | 77 | 52 | 0.68 |
| | 195 | 27.5 | 77 | 67 | 0.81 |
| | 500 | 9.6 | 198 | 71 | 0.36 |
| | 500 | 1 | 298 | 71 | 0.24 |
| | 738 | 9 | 198 | 78 | 0.39 |

The present process is most efficiently performed if $T_1$, the adsorption temperature is less than 616° K. but higher than 233° K. This is for the reason that above such range, the water in contact with zeolite X will tend to damage the zeolite X structure, thereby fundamentally changing the adsorption character of the adsorbent to cause loss of capacity of the zeolite X. Below 233° K. relatively economical refrigerants such as Freon-12 cannot be employed, thereby necessitating more expensive refrigerating systems. Also, mechanical properties of metals deteriorate rapidly below about 233° K., so that special construction materials must be employed for adsorbers operating in this low temperature range. The increase in zeolite X adsorptive capacity for water at reduced temperatures justifies the employment of refrigeration down to 233° K. level.

The present invention also contemplates a process for continuously separating water from a vapor mixture containing at least one member of the group consisting of methane, ethane, propane, isobutane, hexane and low boiling point gases such as oxygen, hydrogen, nitrogen and air. This continuous process includes two steps, an adsorption stroke and a regeneration stroke. The adsorption stroke is the same as the previously described adsorption where the temperature ratio $T_2/T_1$ is between .51 and 1.0, and the broad range for $T_1$ is less than 973° K. In the regeneration stroke, at least part of the adsorbed water is removed by subjecting the zeolite X adsorbent to conditions such that the temperature ratio $T_1/T_2$ at the end of the regeneration stroke with respect to the water is less than the temperature ratio at the end of the adsorption stroke. Also, the difference in total adsorbate loading between the ends of the adsorption and regeneration strokes is at least 0.02 weight percent for increased efficiency of the overall continuous process. A lower differential adsorbate loading would entail prohibitively large adsorber units. During the regeneration stroke, $T_1$ is the regeneration temperature and is less than 973° K. for the broad range, and $T_2$ is the temperature at which water has a vapor pressure equal to its partial pressure over the zeolite X bed at the end of the regeneration. It will be understood by those skilled in the art that at least two adsorbent beds may be provided, with one bed on adsorption stroke and the other bed on regeneration stroke. The respective flows are then periodically switched when the first bed becomes loaded with the adsorbate, so that the latter is placed on regeneration stroke and the second bed is placed onstream. For water adsorption, the continuous process is most efficiently performed if $T_1$, the adsorption or regeneration temperature, is less than 616° K. but higher than 233° K. for previously stated reasons. Also, for maximum efficiency the difference in total water loadings between the ends of the adsorption and regeneration strokes is preferably at least 0.5 weight percent. Under these conditions the process is carried out with a high degree of efficiency with the use of a smaller bed.

It will be understood by those skilled in the art that the temperature ratio may be adjusted by well-known methods, as for example, heating the bed by direct or indirect heat transfer, employing a purge gas, or by drawing a vacuum on the bed during the regeneration stroke. Also, during the regeneration stroke the ratio may be adjusted for favorable operation by varying either or both the temperature and the pressure.

The many advantages of the invention are illustrated by the following examples:

*Example I*

A moist stream of $CH_4$ with a dew point of 0° C. and at a total pressure of one atmosphere is to be contacted with a bed of zeolite X at a temperature of 298° K. (25° C.). Furthermore the zeolite X bed is to be regenerated to effect continuous operation.

The potential capacity of the bed to adsorb water from the moist stream of $CH_4$ at the bed inlet section may be determined as follows: The dew point of water $T_2$ is 273° K. Accordingly $T_2/T_1$ will be 273/298 or 0.92. This temperature ratio will provide a loading of 31 weight percent of water on the zeolite X adsorbent as determined by a reading of the plot of FIGURE 1.

The potential capacity of the adsorbent bed inlet end for methane may be determined in a similar manner. $T_2$ is 112° K. $T_2/T_1$ is 0.38 and the loading for methane from the FIGURE 2 graph is less than 0.1 weight percent.

If an effluent having a dew point of −40° C. is desired, the adsorption process may be stopped when the moisture content of the effluent corresponds to the specified value, i.e., about 0.1 mm. Hg partial pressure of water.

If a bone-dry effluent is desired, the adsorption process is terminated as soon as traces of water appear in the effluent.

During the regeneration stroke the bed temperature is raised to 535° K. (262° C.) while simultaneously purging with heated moist influent gas. The $T_2$ value for water at these conditions is 273° K. Under these conditions, the $T_2/T_1$ ratio will be 0.51 and the residual loading will be reduced to about 2 weight percent.

*Example II*

A stream of moist nitrogen having a dew point of 0° C. (273° K.), at a total pressure of 30 atmospheres is contacted with a bed of zeolite X at a temperature of 100° C. (373° K.). Furthermore, the zeolite X bed is to be regenerated to effect continuous operation.

The potential capacity of the bed to adsorb water at the bed inlet section may be determined as follows: the dew point of water, $T_2$ is 273° K. Accordingly, $T_2/T_1$ will be 273/373, or 0.73. The temperature ratio will provide a loading of 18 weight percent of water on zeolite X as determined by a reading of the FIGURE 1 graph.

The potential capacity of the adsorbent bed inlet for nitrogen may be determined in similar manner. $T_2$ is 123° K., $T_2/T_1$ is 123/373, or 0.33, and the loading for nitrogen, from the FIGURE 3 graph, is about 4 weight percent.

If it is desired to produce an effluent having a dew point of −40° C., it is merely necessary to stop the adsorption process when the effluent moisture content corresponds to the specified value, i.e., at a partial pressure of water of about 0.1 mm. Hg. If bone-dry effluent is desired, the adsorption process should be stopped when the first traces of water appear in the effluent.

During the regeneration stroke, the bed temperature is raised to 535° K. (262° C.) while simultaneously purging with heated moist influent gas. The $T_2$ value for water under these conditions is 273° K. and the $T_2/T_1$ ratio is 273/535 or 0.51, and the residual loading of water will be reduced to about 2 weight percent.

If the inlet vapor mixture were to contain hydrogen, air, or oxygen, the potential capacity of zeolite X would be determined in an analogous manner.

What is claimed is:

1. A process for separating water from a vapor mixture containing water and at least one member of the group consisting of methane, ethane, propane, isobutane, hexane, oxygen, hydrogen, nitrogen and air which comprises contacting said vapor mixture with a bed of at least partially dehydrated crystalline zeolite X adsorbent material and thereafter discharging the water depleted vapor stream from said bed.

2. A process in accordance with claim 1 wherein said adsorbent material is sodium zeolite X.

3. A process according to claim 1 in which said vapor mixture contains water and methane.

4. A process according to claim 1 in which said vapor mixture contains water and ethane.

5. A process according to claim 1 in which said vapor mixture contains water and propane.

6. A process according to claim 1 in which said vapor mixture contains water and isobutane.

7. A process according to claim 1 in which said vapor mixture contains water and hexane.

8. A process according to claim 1 in which said vapor mixture contains water and oxygen.

9. A process according to claim 1 in which said vapor mixture contains water and hydrogen.

10. A process according to claim 1 in which said vapor mixture contains water and nitrogen.

11. A process according to claim 1 in which said vapor mixture contains water and air.

References Cited in the file of this patent

"Separation of Mixtures Using Zeolites as Molecular Sieves," Part I; Three Classes of Molecular-Sieve Zeolite, by R. M. Barrer, J. Soc. Chem. Ind., vol. 64, May 1945, pages 130–135.

"Examine These Ways To Use Selective Adsorption," Petroleum Refiner, vol. 36, No. 7, pages 136–140.